March 3, 1936. A. S. MACKENZIE 2,033,082
BURR EXTRACTOR
Filed Feb. 23, 1933 3 Sheets-Sheet 1

Inventor
Alexander S. Mackenzie.
By Cushman, Dupont, Darby & Cushman
Attorneys

March 3, 1936.  A. S. MACKENZIE  2,033,082
BURR EXTRACTOR
Filed Feb. 23, 1933  3 Sheets-Sheet 2

Inventor
Alexander S. Mackenzie
By Cushman, Bryant, Darby & Cushman
Attorneys

March 3, 1936. A. S. MACKENZIE 2,033,082
BURR EXTRACTOR
Filed Feb. 23, 1933 3 Sheets-Sheet 3

Inventor
Alexander S. Mackenzie,

Patented Mar. 3, 1936

2,033,082

UNITED STATES PATENT OFFICE 2,033,082

BURR EXTRACTOR

Alexander S. Mackenzie, Houston, Tex., assignor, by mesne assignments, to Elk City Cotton Oil Company, a corporation of Oklahoma Application February 23, 1933, Serial No. 658,225

24 Claims. (Cl. 19—37)

This invention relates to burr extractors for the removal of burrs and trash from unclean seed cotton.

Its object is to provide a machine wherein the material is fed uniformly and evenly to the saw assembly, as distinguished from its being thrown against the saw by a picker roll, as has been the practice, and this is accomplished by having a feed opening appropriately placed and through which the cotton is introduced, such feed opening preferably, as here shown, though not necessarily, extending substantially the entire length of the machine, so that the cotton is fed uniformly in a web or bat to feeding devices, which, in turn, feed it evenly to the saw.

Means are provided for stripping the burrs and so handling them that the stripped burrs cannot again mix with the incoming cotton.

Furthermore, provision is made for limiting the amount of cotton passing to the outlet and returning a certain surplus to the feed roll, this return acting to loosen the returned surplus and free burrs which have not been initially stripped, this being thrown into the cotton stream coming from the inlet and again carried to the feed roll, and thence to the saw assembly.

One embodiment of this invention is disclosed in the accompanying drawings, although it will be understood that the embodiment shown is illustrative and not restrictive of the invention, which may be developed in other mechanical forms.

Figure 1:
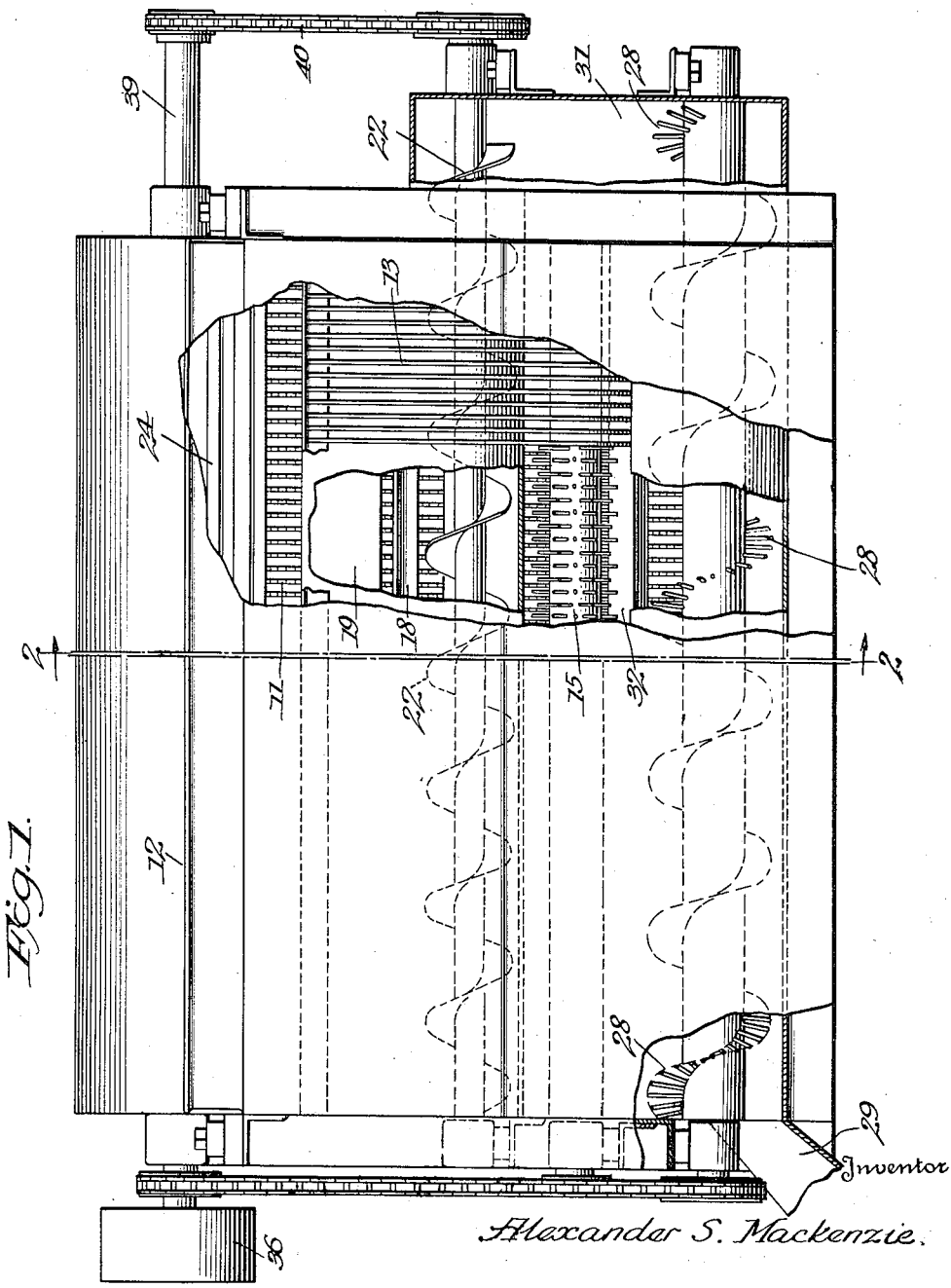
Figure 1 is a transverse section of the machine.

Referring to the drawings, the invention, as here disclosed, comprises a casing 10 within which is suitably mounted a rotary saw assembly 11. At a suitable point, as here illustrated, at the top of the casing, there is provided an opening 12, which, preferably, and as here shown, extends substantially the entire width of the casing. Below this opening is positioned guiding means, here shown as an open-work grid 13, which terminates at its lower end short of the saw assembly to leave a trash and burr outlet 14 between the grid and saw assembly.

The numeral 15 designates a feed roll positioned in close proximity to the saw assembly and above the grid 13, this roll comprising a hub portion 16 from which radiate a plurality of pick fingers 17 arranged in any suitable fashion to ensure handling of the cotton. As here shown, they are disposed in parallel rows circumferentially of the hub. This differs from the arrangement of picker roll ordinarily used, which throws the cotton against the saw and wherein the fingers are spirally arranged to convey the cotton and burrs transversely of the saw, the feed roll of my invention effecting relatively slow, and particularly, a uniform, straight feed to the saw assembly. The construction and disposition of the feed roll is such that the cotton entering through the opening 12 will slide down the grid 13 to the feed roll, which will feed the cotton uniformly to the saw, and, where the inlet 12 extends across the entire width of the casing, the cotton is fed in the form of a bat or web. The saw 11, which is designed to travel much faster than the feed roll, will pick the cotton from the roll and carry it upwardly to the burr stripping and other instrumentalities.

The stripping action is accomplished by a stationary stripper or strippers, a pair of strippers 18 and 19, respectively, being here shown. Each stripper is provided with a substantially straight side and a portion 21, here shown as curved, joining the straight side to form a stripping edge. The arrangement is such that the cotton, as it is carried upwardly by the saw, contacts with the strippers 18 and 19, so that the cotton will be retained on the saw teeth but the burrs will be separated and deflected by the curved portion 21 to a conveyor 22 mounted in a casing 23, by which they can be completely removed from the machine, if desired, so that they cannot again mix with the incoming cotton; or, as hereinafter explained, returned independently of the cotton feed to mechanism for again subjecting the burrs to the saw for gleaning any adhering cotton fragments from them.

Figure 2:
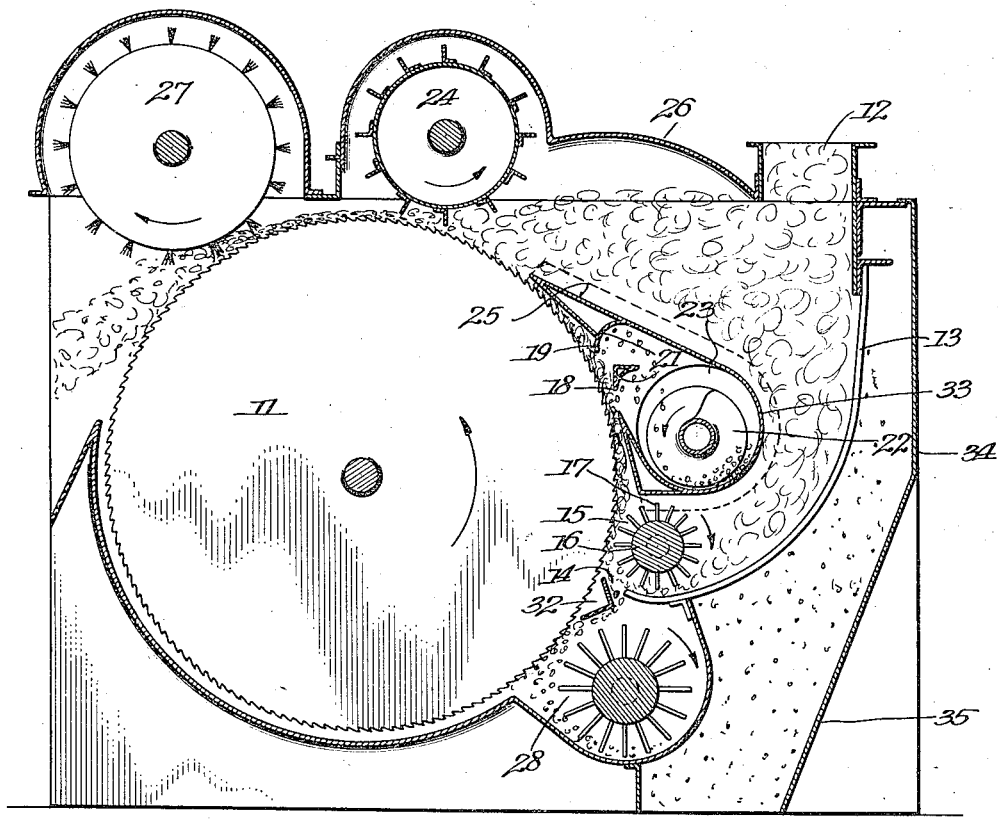
Figure 2 is a view, partly in section, in end elevation, of the machine.

The conveyor casing 23 is preferably formed as shown in Figure 2, and extends the full length of the machine, being preferably provided with flanges at its ends, as shown in dotted lines in Figure 2, which flanges are secured in any suitable manner to the walls of the main casing 10. In cross section the conveyor casing is of general triangular shape, with its base adjacent the feed roll, and within which base the burr conveyor 22 is mounted, the base portion of the triangle being spaced from the openwork grid 13 and serving to guide the incoming cotton to the feed roll. The side of the conveyor casing 23 facing the saw assembly is disposed in such relation to the saw as to guide the cotton stream carried up by the saw and confine it, and this wall of the casing 23 is provided with a burr-receiving opening to permit the burrs passing therethrough to be delivered to the conveyor 22. As pointed out, a stripper or strippers are provided adjacent the opening in the wall of the conveyor casing 23 to remove the burrs from the cotton. The upper end of the casing 23, forming the apex of the triangle, extends an appreciable distance along the saw and acts as a divider for surplus cotton which, as will now be described, is, by another instrumentality, returned to the feed roll for further action.

The cotton is next carried by the saw under a revolving drum 24, which may be similar in construction to the usual rotary stripper. In view of the fact, however, that substantially all of the burrs have been removed from the cotton by the stationary strippers 18 and 19 before they come into contact with the revolving drum 24, this drum does not have a strictly burr removing action, but serves to remove surplus cotton and, incidentally, burrs which may be left with this cotton, and returns it over a divider board 25, formed, preferably, by the top of conveyor casing 23, back to the grid 13, down which it passes to the feed roll 15 and is again fed to the saw. Preferably, the cover portion of the main casing will be somewhat elevated, as shown at 26 in Figure 2, thus giving a sufficient throat for the surplus cotton thrown back by the rotary drum 24 to pass freely and in loosened condition to the incoming cotton stream from the inlet 12. The material which passes by the drum 24 is finally removed from the machine by means of a rotary brush 27, this cotton then being ready for the ginning or other operations.

Figure 3:
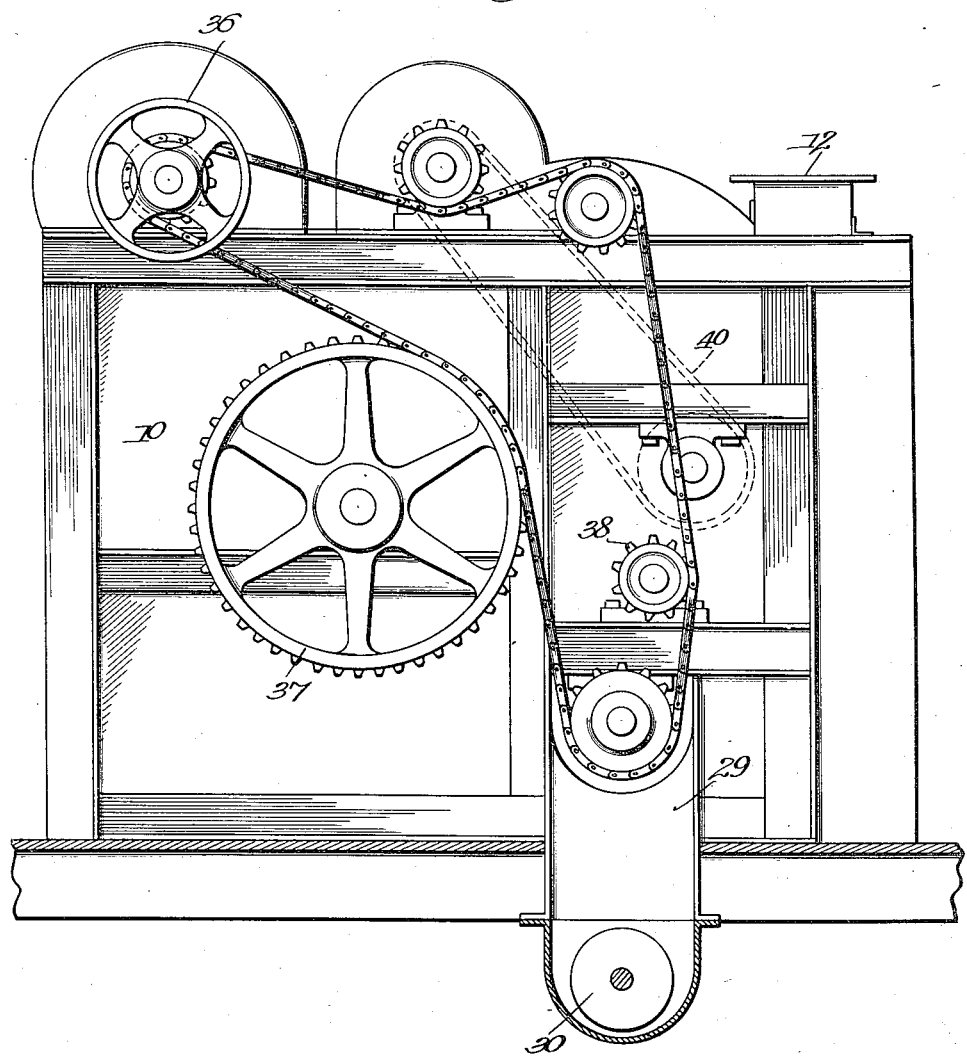
Figure 3 is an end view, partly in section, of the machine.

The numeral 28 designates a picker roll and conveyor, preferably positioned below the feed roll and the opening 14, and, similarly to the feed roll and conveyor 22, extends substantially the entire length of the casing 10, where it delivers, as shown in Figures 1 and 3, to a chute 29, down which the burrs pass to a conveyor 30, preferably, and as here shown, beneath the floor, which carries away the burrs, trash, and dirt.

As shown in Figure 1, a hopper 31 is provided at one end of the casing to which the conveyor 22 delivers the burrs, and through which hopper 31 the burrs pass to the picker roll 28, which, as shown, extends into said hopper. This arrangement is to permit the burrs which have been separated from the cotton by the strippers 18 and 19, to pass to the picker roll, to be fed across the machine, and again thrown against the saw, which will reclaim or glean any fragments of cotton which might otherwise be discarded with the burrs. In order to prevent the burrs from again moving past the feed roll, a stripper 32 is positioned directly above the picker roll to deflect the burrs back to the picker roll.

The surplus cotton which is kicked back by the revolving drum 24 is, as stated above, returned to the feed roll. This action loosens any burrs which have escaped the stationary strippers, so that when this cotton with the burrs again comes to the feed roll the loose burrs will fall through the opening 14, and pass directly to the picker roll, where they are again acted upon by the saw to reclaim any fragments which have adhered to the burrs. This further action will also recover such small quantities of loose cotton as may have fallen through the opening 14.

The said stripper 32 is so shaped and so disposed relative to the saw, the feed roll, and the picker roll, that it serves the double function of deflecting the loose burrs away from the saw and diverting them to the picker roll, and also deflecting the loose burrs thrown against the saw by the picker roll, but which are rejected by the saw, back into the picker roll casing. In the form here shown, the stripper 32 is right angled in cross section, with one leg opposite the picker roll 28. The stripper 32 is also so arranged that one outerface will be toward the burrs coming from the opening 14 and the loose burrs coming from the feed roll, while the other outer face will be in the path of the loose burrs coming from the picker roll.

It will be seen that with this arrangement of conveyor 22, hopper 31, and picker roll 28, the burrs which are delivered to the picker roll will be carried by that picker roll through the machine, thus delivering to the saw burrs having fragments of cotton which should be gleaned, and the completely stripped hulls carried out of the machine.

The machine, therefore, not only very effectively extracts the burrs, but insures their thorough cleaning by this return of the burrs to the action of the saw, and, furthermore, the stripper 32 which acts upon the burrs returned by the picker roll insures the elimination of such burrs as are not sufficiently cotton-loaded to adhere to the saw, and these will pass out through the delivery chute to the trash conveyor. The stripper 32 will, of course, throw the burrs back into the picker roll, where they are finally carried from the machine.

Referring to Figure 2, it will be observed that the conveyor 22 is enclosed within casing 23 which forms the divider board 25 and the elements forming the strippers 18 and 19, these parts being connected by a substantially curved portion 33, which cooperates with the grid 13 to guide the unclean cotton to the feed roll 15. It should further be stated that the grid 13 is spaced from the wall 34 of the casing and that this wall is inclined at its lower end, as at 35, to provide a hopper. This arrangement permits sticks, leaf trash, loose burrs, etc., to sift through the grid and escape from the machine through the hopper.

In Figure 3 is shown the drive for the various parts. The brush shaft is the main drive shaft, being provided with pulley 36, to be driven from any suitable source of power in the direction of the arrow, Figure 2. A sprocket and chain drive from the power shaft engages the large gear 37 on the saw assembly, and drives the saw in the direction of the arrow shown in Fig. 2. The same chain drive engages a sprocket on the feed roll, and drives that in the direction of the arrow, and also engages sprockets on the picker roll and revolving drum 23 of the stripper, an idler 38 being provided to support the chain drive adjacent the sprocket for the stripper 23.

The shaft of the stripper drum has an extended portion 39 at the opposite end of the machine, with sprocket and chain drive 40 down to the extended shaft of the conveyor 23, so as to drive the conveyor 23 in the direction shown by the arrow, Figure 2.

From the foregoing, it will be seen that the burr extractor initially acts upon the cotton, fed uniformly and evenly to the saw; that the stripped burrs are immediately separated and prevented from again mixing with the cotton; that these burrs, however, are again subjected to the action of the saw to gleam any fragments of cotton adhering to the burrs before they are finally discharged; that surplus cotton which has passed once to the feed roll is returned to the saw to separate out any burrs still remaining in the re-fed cotton, and the cleaned cotton carried out of the machine while the completely gleaned burrs and trash are separately removed.

It will be understood that such changes in and departures from the construction here shown as call only for the exercise of mechanical skill may be made and still fall within the range of my invention.

I claim:

1. In a burr extractor, the combination of a casing having a feed opening, a saw assembly therein, a feed roll to deliver material to said saw, a burr conveyor, a conveyor casing extending from said feed roll along the saw face an appreciable distance and having a burr-receiving opening facing said saw, stationary strippers adjacent said burr-receiving opening, and movable means adjacent said saw and located beyond said conveyor casing to return surplus cotton to said feed roll.

2. In a burr extractor, the combination of a casing having a feed opening, a saw assembly therein, a feed roll to deliver material to said saw, a burr conveyor, a conveyor casing extending from said feed roll along the saw face an appreciable distance and having a burr-receiving opening facing said saw, stationary strippers adjacent said burr-receiving opening, and rotary means adjacent said saw and located beyond said conveyor casing to engage the cotton stream and return surplus cotton to said feed roll.

3. In a burr extractor, the combination of a casing having a feed opening, a saw assembly therein, a feed roll to deliver material to said saw, a burr conveyor, a conveyor casing of substantially triangular shape in cross section extending from said feed roll along the saw face an appreciable distance and having a burr-receiving opening facing said saw, stationary strippers adjacent said burr-receiving opening, and rotary means adjacent said saw and located beyond said conveyor casing to return surplus cotton to said feed roll.

4. In a burr extractor, the combination of a casing having a feed opening, a saw assembly therein, a feed roll to deliver material to said saw, a burr conveyor, a conveyor casing of substantially triangular shape in cross section extending from said feed roll along the saw face an appreciable distance and having a burr-receiving opening facing said saw, stationary strippers adjacent said burr-receiving opening, rotary means adjacent said saw and located beyond said casing to return surplus cotton to said feed roll, and movable means to remove the cotton from said saw.

5. In a burr extractor, the combination of a casing having a feed opening, a saw assembly therein, a feed roll to deliver material to said saw, a burr conveyor, a conveyor casing of substantially triangular shape in cross section extending from said feed roll along the saw face an appreciable distance and having a burr-receiving opening facing said saw, stationary strippers adjacent said burr-receiving opening, rotary means adjacent said saw and located beyond said casing to return surplus cotton to said feed roll, and a rotary brush to remove the cotton from said saw.

6. In a burr extractor, the combination of a casing having a feed opening, a saw assembly therein, a feed roll adjacent said saw to receive the cotton from said feed opening and deliver it uniformly to said saw, and a deflector adjacent said saw and feed roll and below the latter to engage burrs moving about the feed roll and direct the same away from the saw face.

7. In a burr extractor, the combination of a casing having a feed opening, a saw assembly therein, a feed roll adjacent said saw to receive the cotton from said feed opening and deliver it uniformly to said saw, a deflector adjacent said saw and feed roll and below the latter to engage burrs moving about the feed roll and direct the same away from the saw face, and a picker roll to which said burrs are delivered.

8. In a burr extractor, the combination of a casing having a feed opening, a saw assembly therein, a feed roll adjacent said saw to deliver material to said saw, means to deliver the cotton from said inlet to said feed roll, a burr deflector adjacent said saw and feed roll and below the latter to engage burrs moving about the feed roll and direct the same away from said saw, and a picker roll to which said burrs are delivered.

9. In a burr extractor, the combination of a casing having a feed opening, a saw assembly therein, a feed roll adjacent said saw to deliver material thereto, an open-work trash-removing grid to deliver the cotton from said inlet to said feed roll, a burr deflector adjacent said saw and below said feed roll to engage burrs moving about the feed roll and direct the same away from said saw, and a picker roll to which said burrs are delivered.

10. In a burr extractor, the combination of a casing having a feed opening, a saw assembly therein, a feed roll to deliver material to said saw, a burr conveyor, a conveyor casing, a stationary stripper adjacent said saw to deliver burrs to said conveyor, a picker roll delivering to said saw, means for delivering burrs from said burr conveyor to said picker roll, and a deflector plate to return burrs rejected by said saw to said picker roll.

11. In a burr extractor, the combination of a casing having a feed opening, a saw assembly therein, a feed roll to deliver material to said saw, means for directing the material to said feed roll, a burr conveyor, a conveyor casing, a stationary stripper to extract and deliver burrs to said burr conveyor, a picker roll to deliver burrs to said saw, a burr directing hopper to deliver burrs from said burr conveyor to said picker roll, and a deflector plate adjacent said saw between said feed roll and said picker roll to deflect loose burrs coming from each of said rolls to the picker roll.

12. In a burr extractor, the combination of a casing having a feed opening, a saw assembly therein, a feed roll to deliver material to said saw, means for directing the material to said feed roll, a burr conveyor, a conveyor casing, a stationary stripper to extract and deliver burrs to said burr conveyor, a picker roll to deliver burrs to said saw, a burr directing hopper to deliver burrs from said burr conveyor to said picker roll, and a deflector plate substantially triangular in cross section adjacent said saw between said feed roll and said picker roll to deflect loose burrs coming from each of said rolls to the picker roll.

13. In a burr extractor, the combination of a casing having a feed opening, a saw assembly therein, feeding means for delivering material to said saw, a conveyor casing having a burr-receiving opening in the wall adjacent said saw, stripper means adjacent said opening to extract the burrs from the material and deliver them to said conveyor casing, burr conveying means in said casing, and means to engage surplus material in the stream carried by said saw and return the same to said feeding means, said casing serving to divide and separate the returning stream of material from the saw stream.

14. In a burr extractor, the combination of a casing having a feed opening, a saw assembly therein, feeding means for delivering material to said saw, a conveyor casing substantially triangular in cross section having a burr-receiving opening in the wall adjacent said saw, stripper means adjacent said opening to extract burrs from the material and deliver them to said casing, burr conveying means in the base of said triangular casing, and means to engage the surplus material in the stream carried by said saw past the apex of said casing and return the same to said feeding means, said casing serving to divide and separate the returned stream of material from the saw stream.

15. In a burr extractor, the combination of an outer casing having a feed opening, a saw assembly therein, a feed roll to deliver material to said saw, an inner casing, said inner casing having an opening in one wall thereof adjacent said saw, the opening extending in a substantially vertical plane so that the upper edge of the opening will serve as a stripper and cause material removed from said saw to fall into said inner casing, and conveyor means in said inner casing to remove burrs therefrom.

16. In a burr extractor, the combination of a casing having a feed opening, a saw assembly therein, a feed roll to deliver material to said saw, a revolving stripper, a burr conveyor, a conveyor casing positioned between said feed roll and said revolving stripper and including a wall extending along the saw face an appreciable distance and an upper wall extending at an angle to said first wall and toward said saw assembly, a burr-receiving opening in said first wall, a stationary stripper adjacent the opening to deflect burrs to said conveyor, said rotary stripper being adapted to remove material from said saw assembly and move the same over the second wall of said conveyor casing to said feed roll.

17. In a burr extractor, the combination of a casing having a feed opening, a saw assembly therein, a feed roll to deliver material to said saw, a burr conveyor, a conveyor casing extending from said feed roll along the saw face an appreciable distance and having a burr-receiving opening facing said saw, a stationary stripper adjacent said burr-receiving opening and means adjacent said saw and located beyond said conveyor casing to return surplus cotton to said feed roll.

18. In a burr extractor, the combination of a casing having a feed opening, a saw assembly therein, a feed roll to deliver material to said saw, a burr conveyor, a conveyor casing including a wall extending from said feed roll along the face of said saw an appreciable distance and having a burr-receiving opening facing said saw and a second wall extending from said first wall and substantially tangentially with respect to said saw, a stationary burr stripper adjacent said burr-receiving opening to deflect burrs to said conveyor, and means adjacent said saw and located beyond said conveyor casing to return surplus cotton to said feed roll.

19. In a burr extractor, the combination of a casing having a feed opening, a saw assembly therein, a feed roll to deliver material to said saw, a burr conveyor, a conveyor casing including a wall extending from said feed roll along the face of said saw an appreciable distance and having a burr-receiving opening facing said saw and a second wall extending from said first wall and substantially tangentially with respect to said saw, a stationary burr stripper adjacent said burr-receiving opening to deflect burrs to said conveyor, and rotary means adjacent said saw and located beyond said conveyor casing to return surplus cotton to said feed roll.

20. In a burr extractor, the combination of a casing having a feed opening, a saw assembly therein, a feed roll to deliver material to said saw, a burr conveyor, a conveyor casing including a wall extending from said feed roll along the face of said saw an appreciable distance and having a burr-receiving opening facing said saw and a second wall extending from said first wall and substantially tangentially with respect to said saw, a stationary burr stripper adjacent said burr-receiving opening to deflect burrs to said conveyor, means adjacent said saw and located beyond said conveyor casing to return surplus cotton to said feed roll, and means located beyond said last-named means to remove the cotton from said saw.

21. In a burr extractor, the combination of a casing, a saw assembly, a cotton feeding conduit in said casing including a wall extending toward said saw, a feed roll in said conduit adjacent said saw and a deflector beneath said feed roll and between and spaced from said saw and the adjacent edge of said wall of said conduit to deflect loosened burrs from the face of said saw.

22. In a burr extractor, the combination of a casing, a saw assembly, a cotton feeding conduit in said casing including a wall extending toward said saw, a feed roll in said conduit adjacent said saw and a deflector beneath said feed roll and between and spaced from said saw and the adjacent edge of said wall of said conduit to deflect loosened burrs from the face of said saw, and a picker roll to which said burrs are delivered.

23. The combination with a saw assembly, a feed roll and means to remove surplus cotton from said saw assembly, of a burr conveyor casing positioned between said feed roll and surplus removing means, said casing including a wall adjacent said saw assembly and a wall extending toward said saw assembly, said first wall having an opening therein and including means to deflect burrs into the conveyor casing, the second wall of said casing serving to deflect material removed from said saw assembly by said surplus removing means.

24. In a burr extractor, the combination of an outer casing having a feed opening, a saw assembly therein, a feed roll to deliver material to said saw, an inner casing, said inner casing having an opening in one wall thereof adjacent said saw, the upper and lower edges of said opening being closely adjacent said saw, a stationary stripper between said edges to remove burrs from the saw, and conveyor means in said inner casing to remove burrs therefrom.

ALEXANDER S. MACKENZIE.